Jan. 23, 1951  E. L. SHIELDS  2,539,037
ROD WEEDER
Filed July 18, 1946
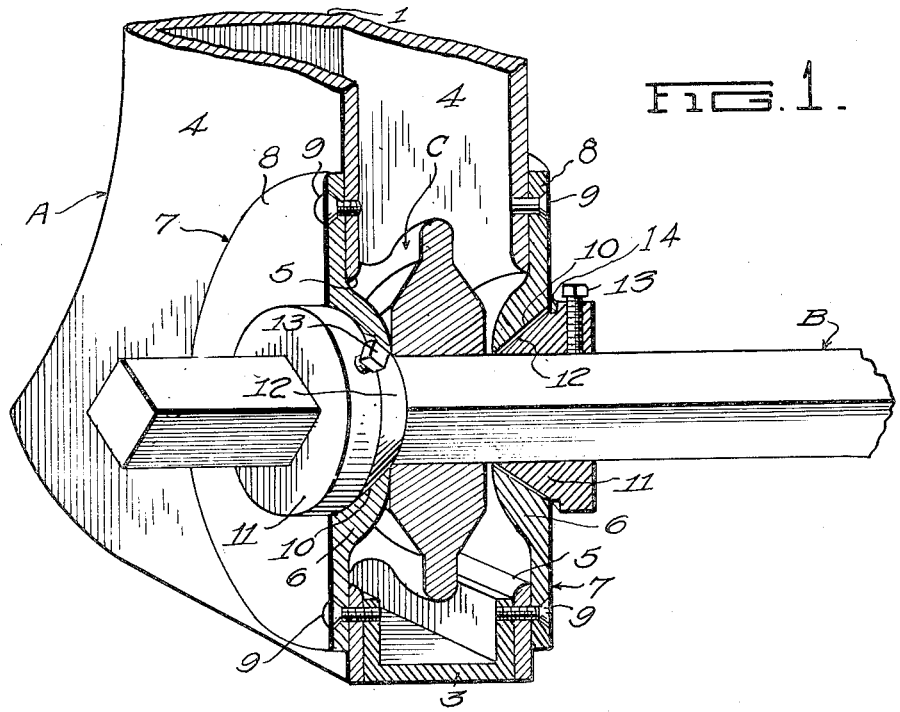
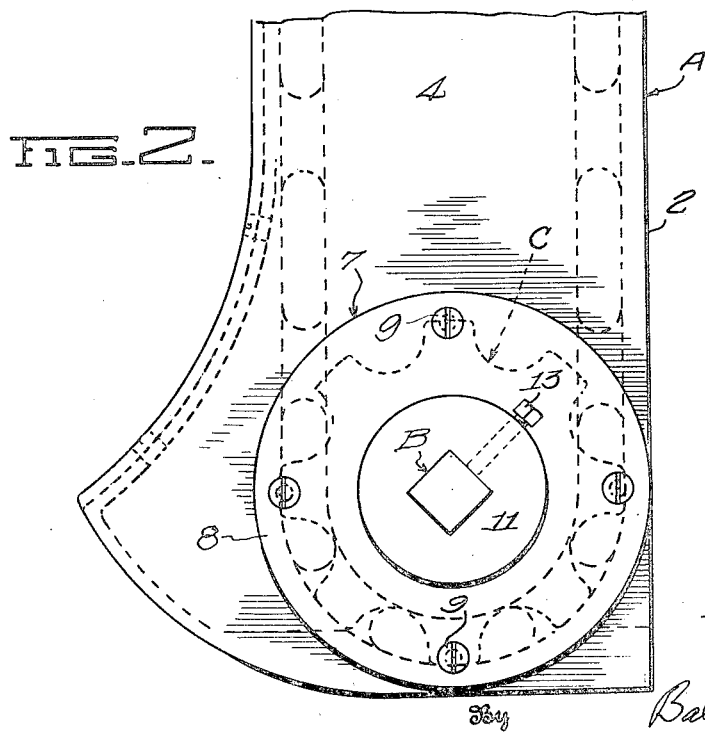
Inventor
ED L. SHIELDS
Baldwin & Wight
Attorneys Patented Jan. 23, 1951

2,539,037

UNITED STATES PATENT OFFICE 2,539,037

ROD WEEDER

Ed L. Shields, Oberlin, Kans.

Application July 18, 1946, Serial No. 684,573

6 Claims. (Cl. 97—42)

This invention relates to rod weeders and more particularly to a structure for supporting and journalling the rotary rod of a rod weeder or similar agricultural machine.

In a well known form of rod weeder or cultivator, a wheeled frame structure is provided with two spaced and depending hangers or shoes on the lower ends of which the rotary weeder rod is journalled. One known form of hanger comprises a box-like construction equipped with bearings for journalling the rotary rod. A sprocket, secured to the shaft, is housed within the box-like hanger and is driven by a chain extending upwardly from the sprocket to drive mechanism on the main frame. Inasmuch as the rotary rod operates at a sub surface level, the rod bearings are subjected to the wearing and cutting action of grit and dirt. To meet this difficulty, it previously has been proposed to use so-called "dirt proof" or sealed rod weeder bearings; but in so far as I am aware, no rod weeder bearing construction known heretofore has actually been practical in the sense of being easily maintainable in good operating condition, and, at the same time, economical.

Generally stated, the object of the present invention is to provide a rod weeder construction including economical, sturdy, and easily maintainable and/or replaceable bearings for journalling the rotatable weeder rod. More specific objects will become apparent from a reading of the following description, the appended claims, and the accompanying drawing, in which:

Figure 1 is a sectional perspective view of a portion of a weeder rod hanger, weeder rod and bearing assembly embodying the invention; and Figure 2 is a side elevation of the construction shown in Figure 1.

The drawing shows the lower portion of only one of the usual two rod hangers or shoes, one end of a weeder rod, and associated bearing parts. The illustrated hanger or shoe, generally designated A is adapted to be suspended from the machine main frame (not shown) and serves as a support for one end of the rotatable weeder rod B, the other end of which is supported by a similar hanger or shoe (not shown).

The hanger A is in the form of a hollow box-like structure comprising front and rear walls 1 and 2, respectively, a bottom 3, and spaced side walls or members 4—4.

The side members 4—4 are formed with aligned openings 5—5 which receive the inward projections or bosses 6—6 of outer bearing members generally designated 7—7. The members also comprise flanges 8—8 detachably secured in abutting relation to the adjacent side members by screws 9. The bearing members 7—7 are formed with tapered or frusto-conical outer bearing openings 10—10, the larger ends of which face outwardly from the adjacent or respectively associated side members 4—4.

The weeder rod B extends through the outer bearing openings or surfaces 10—10 and is journalled in the outer openings by inner bearing members 11—11 formed with frusto-conical inner bearing surfaces 12—12 mating with the outer bearing surfaces 10. The bearing members 11 are provided with set screws 13 for maintaining the members 11 in adjusted position axially of the rod B.

A sprocket C, for driving the rod B, is mounted on the rod between the bosses 6 of the outer bearing members 7. The rod B may be square, as shown or otherwise formed or equipped to maintain the sprocket and rod against relative rotation, while permitting relative axial movement between these parts. However, in the assembled construction, the bearing members 7 and 11 maintain the rod B against axial movement with respect to the hanger A; and the bosses 6—6 of the outer bearing members confine the sprocket C and maintain it against substantial axial shifting.

As shown in Figure 1, the inner bearing members 11—11, when new and substantially unworn, terminate short of the adjacent faces of the sprocket C. This enables the members 11—11 to be adjusted inwardly to compensate for wear. Shoulders 14 on the members 11—11 are spaced from the adjacent faces of the flanges 8—8 by an amount substantially equal to the initial setting distance between the inner ends of the members 11—11 and the sprocket faces. Thus, after several successive adjustments have been made to compensate for wear, the shoulders 14 will engage or closely approach the flanges 8 when the inner ends of the members 11 engage or closely approach the sprocket faces. This gives a visual indication, observable from outside the hanger A, that no substantial further adjustment can be effected without renewing the parts, or some of them.

The bearing members 7 and 11 preferably are made of chilled hard metal but need not be precision finished and are intended to be operated without any special lubrication. They are rugged and with a few adjustments from time to time can be maintained in good operating condition. When worn beyond capacity for further adjustment, they may be replaced quickly in the field.

The construction disclosed by way of example embodies the invention in the form now preferred, but it will be understood that some changes may be made without departing from the invention as defined in the claims.

I claim:

1. In a rod weeder, a rod hanger shoe comprising two spaced side members formed with substantially aligned openings; two outer bearing members respectively mounted on said side members and having projections extending into the shoe through the respectively associated side member openings; aligned frusto-conical bearing openings extending through said bearing members with the larger ends of the bearing openings facing outwardly from said side members; a rotatable weeder rod extending through said openings; two inner bearing members on said weeder rod and having frusto-conical surfaces engaging the respective surfaces of said outer bearing member openings; and a drive sprocket mounted on said rod between said outer bearing member projections, said projections maintaining said sprocket in predetermined axial position on said rod.

2. In a rod weeder, a rod hanger shoe comprising two spaced side members formed with substantially aligned openings; two outer bearing members respectively mounted on said side members and having flanges abutting said side members and detachably secured thereto, and boss portions extending into the shoe through the respectively associated side member openings; aligned frusto-conical bearing openings extending through said boss portions with the larger ends of the bearing openings facing outwardly from said side members; a rotatable weeder rod extending through said openings; two inner bearing members on said weeder rod and having frusto-conical surfaces engaging the respective surfaces of said outer bearing member openings, and a drive sprocket mounted on said rod between said boss portions, said boss portions maintaining said sprocket in predetermined axial position on said rod.

3. In a rod weeder, a rod hanger shoe comprising two spaced side members formed with substantially aligned openings; two outer bearing members respectively mounted on said side members and having flanges abutting said side members and secured thereto, and boss portions extending into the shoe and engaging the walls of the respectively associated side member openings; aligned frusto-conical bearing openings extending through said bearing members with the larger ends of the bearing openings facing outwardly from said side members; a rotatable weeder rod extending through said openings; two inner bearing members on said weeder rod and having frusto-conical surfaces engaging the respective surfaces of said outer bearing member openings, and a drive sprocket mounted on said rod between said boss portions, said boss portions maintaining said sprocket in predetermined axial position on said rod.

4. In a rod weeder, a rod hanger shoe comprising two spaced side members formed with substantially aligned openings; two outer bearing members respectively mounted on said side members and having projections extending into the respectively associated side member openings; aligned frusto-conical bearing openings extending through said bearing members with the larger ends of the bearing openings facing outwardly from said side members; a rotatable weeder rod extending through said openings; a drive sprocket mounted on said rod between said outer bearing projections and closely confined axially thereby; two inner bearing members on said weeder rod and having frusto-conical surfaces engaging the respective surfaces of said outer bearing member openings; and means releasably securing said inner bearing members in adjusted position axially of said rod, whereby said inner bearing members can be moved inwardly with respect to said outer bearing members to compensate for wear, said inner bearing members when new and substantially unworn terminating short of said sprocket whereby said inner bearing members can be moved inwardly to compensate for wear without engaging said sprocket.

5. In a rod weeder, a rod hanger shoe comprising two spaced side members respectively having outer bearing means formed with aligned frusto-conical bearing openings, the larger ends of which face outwardly from the respectively associated side members; a rotatable weeder rod extending through said openings; two inner bearing members on said weeder rod and having frusto-conical surfaces engaging the respective surfaces of said outer bearing means openings; a drive sprocket mounted on said rod between said inner bearing members, said inner bearing members normally terminating sufficiently short of said sprocket to permit a predetermined inward movement of said inner bearing members on said rod; and means releasably securing said inner bearing members in adjusted position on said rod.

6. A device as claimed in claim 5, wherein said inner bearing members are provided with shoulders, normally spaced outwardly from the adjacent faces of the respective outer bearing means a distance substantially equal to the spacing of said inner bearing members from said sprocket to afford a visual indication of the extent of wear of said bearing surfaces.

ED L. SHIELDS.

REFERENCES CITED

The following references are of record in the file of this patent:

UNITED STATES PATENTS

| Number | Name | Date |
|---|---|---|
| 165,425 | Quackenbush | July 13, 1875 |
| 1,046,271 | Colwell | Dec. 3, 1912 |
| 1,448,157 | Selik | Mar. 13, 1923 |